Patented Feb. 10, 1931

1,792,009

UNITED STATES PATENT OFFICE

ERIK HAGGLUND, OF ABO, FINLAND

PROCESS FOR THE PRODUCTION OF CELLULOSE

No Drawing. Application filed June 16, 1928, Serial No. 286,053, and in Germany June 21, 1927.

In the manufacture of sodium cellulose the raw material containing cellulose, such as wood and grass is thoroughly opened up by being boiled with alkali. Besides the dissolution and elimination of lignin a partial dissolution of the cellulose takes place especially in the later stages of the opening-up process, whereby the yield of cellulose is diminished. The strength of the fibre is also adversely affected.

The object of the invention is the production of a white sodium cellulose of a specially high fibre strength and a good yield. For this purpose according to the invention, the raw material is boiled with alkali only for the time necessary to effect dissolution of the main quantity of the lignin and a separation of the fibres of the raw material, but it is not boiled for the usual nowadays length of time that it can be bleached with chloride of lime, and be called "bleachable". This raw material, incompletely opened-up by means of alkali is then in the opened-up condition subjected to the influence of chlorine. Thereby hydrochloric acid is generated and a part of the lignins still present is transformed into lignin chloride which is soluble in water or alkali and is eliminated together with the hydrochloric acid by a washing out process.

Beech wood is for instance boiled in a lye of alkali under pressure until a yield of 50 to 53% of dry substance, in relation to dry wood, is obtained. The substance taken from the boiler is then washed and chlorine gas in a quantity of approximately 10 to 15% of the weight is passed into it. The result is a yield of a pliable strong cellulose of 48% of the weight of the wood.

In the case of the sodium cellulose the bleaching of the substance, especially from pine woods, presents great difficulties when the boiling process is not carried through so far until all the lignin has been dissolved.

According to the present process a very clear cellulose can be quickly produced even from pine wood, and even when after the partial opening up with alkali, washing out and introduction of chlorine gas, if a hypochlorite, for instance chloride of lime is introduced into the opened-up substance in the same process of reaction. The hydrochloric acid that has been evolved by action of chlorine on the partially opened-up raw material, is largely absorbed by the fibre so that when a hypochlorite is introduced a "hypochlorous" acid is generated on the fibre and the lignin still present therein, which acid in its nascent state is extraordinarily reactive and therefore acts as a bleaching agent to a very high degree, much stronger than in the processes known hitherto, wherein the already generated acid, was applied to the fibre, as such. By means of the introduction of hypochlorite into the mass, the mass which was darkly coloured by reason of the treatment by chlorine is very considerably lightened in colour.

A complete elimination of the lignin is however not possible in one reaction process. It is therefore preferable to use at first less chlorine and hypochlorite than would correspond to the total quantity of lignin present. The remaining residue of lignin is, after the mass has been washed out, transformed in a second separate bleaching process, into soluble compounds and the bleaching process is thereby terminated.

If for instance it be required that the stuff yielded from beech wood by opening up with sodium lye, still containing 10% of lignin be bleached, then chlorine gas is introduced to a quantity of about 10% of the dry weight of the stuff and the stuff is subjected to its action for about ¼ of an hour. Then 2% of chlorine in the form of chloride of lime is added and the reaction is carried on while continually stirring the stuff. Thereupon the mass is washed at first with water and finally with a little alkali and then a subsequent bleaching is effected with chloride of lime, having a chlorine content of 3 to 4% of the quantity of dry stuff.

Whereas by the use of the hitherto usual processes a yield of only about 38 to 40% of bleached cellulose in relation to dry wood, was obtained from such raw materials as for instance beech wood, and that this cellulose had a strength corresponding to a "tearing length" of 3 to 4 km., the yield with the process according to the invention is approximately 44 to 46% of cellulose of the same clear colour and with a "tearing length" of 7 to 8 km.

What I claim and desire to secure by Letters Patent of the United States is:—

1. Process for the production of bleached cellulose from cellulose containing raw fibrous material, consisting in partly decomposing the material by boiling with alkali, treating the partly decomposed material in aqueous suspension with chlorine for a period sufficient to impart a uniformly brown coloration to the material, completing the decomposition of the material by the addition of chlorine in the form of hypochlorite, whereby intermediary lower chloride acids are formed which change the coloration of the material from brown to a yellowish white, washing the completely decomposed material, and subsequently bleaching the washed material with calcium hypochlorite.

2. Process for the production of bleached cellulose from cellulose containing raw fibrous material, consisting in partly decomposing the material by boiling with alkali, treating the partly decomposed material in aqueous suspension with chlorine for a period sufficient to impart a uniformly brown coloration to the material, completing the decomposition of the material by the addition of chlorine in the form of calcium hypochlorite, whereby intermediary lower chloride acids are formed which change the coloration of the material from brown to a yellowish white, washing the completely decomposed material, and subsequently bleaching the washed material with calcium hypochlorite.

ERIK HAGGLUND.